United States Patent [19]

Dil

[11] 4,310,916
[45] Jan. 12, 1982

[54] OPTICAL RECORD CARRIER AND APPARATUS FOR READING IT

[75] Inventor: Jan G. Dil, Eindhoven, Netherlands

[73] Assignee: U.S. Philips Corporation, New York, N.Y.

[21] Appl. No.: 102,174

[22] Filed: Dec. 10, 1979

[30] Foreign Application Priority Data

Sep. 27, 1979 [NL] Netherlands ............... 7907180

[51] Int. Cl.³ .............................................. G11B 7/24
[52] U.S. Cl. ..................................... 369/109; 369/47; 369/110; 369/111; 369/112; 369/275
[58] Field of Search ............... 179/100.1 G, 100.3 V, 179/100.3 G, 100.3 B, 100.4 C; 358/128.5, 128.6; 360/77; 365/215, 234, 127, 124, 121, 122; 346/761, 108, 135; 369/111, 121, 275, 109, 110

[56] References Cited

U.S. PATENT DOCUMENTS

| | | | |
|---|---|---|---|
| 3,919,697 | 11/1975 | Walker | 360/77 X |
| 3,980,811 | 9/1976 | Schaefer et al. | 179/100.3 V |
| 3,992,593 | 11/1976 | Heine | 179/100.3 V |
| 4,084,185 | 4/1978 | de Lang et al. | 179/100.3 V |
| 4,161,752 | 7/1979 | Basilico | 179/100.3 V |
| 4,167,024 | 9/1979 | Hamisch | 179/100.1 G |
| 4,209,793 | 6/1980 | Ueno | 179/100.3 V |
| 4,209,804 | 6/1980 | Dil | 358/128.5 |

*Primary Examiner*—Raymond F. Cardillo, Jr.
*Assistant Examiner*—Donald McElheny, Jr.
*Attorney, Agent, or Firm*—Thomas A. Briody; William J. Streeter; Algy Tamoshunas

[57] ABSTRACT

A record carrier is described in which information is recorded in an optically readable information structure comprising trackwise arranged information areas; as well as an apparatus for reading said record carrier. By arranging the adjacent information track portions on different slopes the track spacing can be reduced without increasing crosstalk.

22 Claims, 14 Drawing Figures

OPTICAL RECORD CARRIER AND APPARATUS FOR READING IT

BACKGROUND OF THE INVENTION

The invention relates to a record carrier containing information in an optically readable information structure comprising information areas which are arranged in information tracks and, which alternate with intermediate areas in the track direction. The invention also relates to an apparatus for reading such a record carrier.

In the case of a disk-shaped record carrier the information tracks may be arranged in concentric tracks, or, alternatively, interconnected quasi-concentric tracks to form a spiral track.

Such a record carrier and apparatus are known, inter alia from Netherlands Patent Application No. 78 06378, which has been laid open to public inspection. The known record carrier may contain a television program, the information being encoded in the frequency and/or the dimensions of the information areas in the track direction. The information areas may comprise pits pressed into the record carrier surface or hills projecting from said surface. Alternatively, the information may be encoded in digital form, the information areas and intermediate areas also having a constant dimension in the track direction. A specific combination of information areas and intermediate areas then represents a specific combination of digital zeros and ones.

In such optical record carriers it is desirable to maximize the information density and, hence, to maximize the playing time, for example, of a recorded television program. For this purpose the tracks would have to be arranged as close as possible to each other. However, the distance between the information tracks cannot be arbitrarily small. For known record carriers in which the information areas of adjacent information tracks have the same geometry, except for the dimension in the track direction, all the information areas will influence the radiation of the read beam in the same manner. The read spot formed on the information structure by the read beam is a diffraction-limited radiation spot with a specific, for example Gaussian, intensity distribution. The half-value diameter of this spot, i.e. the distance between two points in the spot where the intensity is $1/e^2$ of the intensity in the centre of the spot, is of the order of the track width. This means that even in the case of correct tracking the read spot will illuminate regions adjacent the track being read, and some of the radiation may even be incident on adjacent tracks. The amount of radiation on the adjacent tracks increases as the track distance decreases. A specific portion of the radiation which is incident on the adjacent tracks and which is modulated by the information areas of these tracks can reach the radiation-sensitive detector, which is intended to receive the radiation which has been modulated by the track to be read. This effect, the crosstalk effect, determines the minimum distance between the information tracks.

In Netherlands Patent Application No. 78 06378, which has been laid open to public inspection, it is proposed to increase the information density by giving the information pits of the adjacent tracks different depths and by reading said information tracks with beams of different wavelengths. The depths and wavelengths are selected so that the information areas of a first information track produce a maximum modulation in a beam of a first wavelength, while the information pits of adjacent second information tracks hardly influence the beam, i.e. are hardly observed by this beam. The last-mentioned pits do produce a maximum modulation in a beam of a second wavelength, which beam in turn is hardly influenced by the information pits of the first information tracks. The information tracks may then be arranged substantially closer to each other, without excessive crosstalk.

However, this proposal presents some practical problems. First of all, two radiation sources are required for producing the two beams of different wavelengths, so that the read apparatus becomes more intricate. Secondly, in order to obtain adequate separation during read-out of the two types of information pits, comparatively deep pits, of the order of a several times the wavelength of the associated read beam, have to be formed with an accuracy of the order of a tenth of the wavelength of the read beam. This is a technologically difficult problem.

SUMMARY OF THE INVENTION

It is the object of the present invention to increase the information density in a record carrier for information, such as a television program, an audio program or digital information, for example supplied by and to a computer, without these disadvantages. To this end, in accordance with a first feature of the invention, the record carrier is characterized in that adjacent information track portions of an information carrying surface are situated on a respective one of two surface protions sloping in different directions of an elongated deformation or track on the carrier. The deformation may, for example, be a groove formed in the surface of the record carrier.

When the record carrier is illuminated by the read beam, the radiation coming from one information track will have a different direction than the radiation from an adjacent information track. This arrangement ensures that during readout of a first information track, the radiation coming from a second, adjacent information track does not reach the radiation-sensitive detector employed for read-out.

In the case of a disk-shaped record carrier the adjacent track revolutions may be disposed on different slopes. Preferably, all information tracks with a first or second inclination together constitute a first and a second spiral information track, the read direction of the first spiral information track extending from the centre of the record carrier to the edge of said carrier and the read direction of the second spiral information track extending from the edge of the record carrier to its centre.

It is alternatively possible that consecutive information track portions within a track revolution are situated on different slopes. If a television program is stored in the record carrier, each of the information track portions may contain the information of one television line.

An embodiment of a record carrier is characterized in that for two adjacent information track portions the inclinations are equal but opposite. Of the embodiments which are possible this record carrier will be the simplest to realize.

Another embodiment of a record carrier is characterized in that for two adjacent information track portions the angle of inclination is 90°. This record carrier has the advantage that it is partly compatible with a known record carrier, i.e. that the information track with an angle of inclination of 90° can be read by currently used read apparatus. The inclined information track may contain additional information which can be read with an adapted read apparatus.

The angle of inclination is to be understood to mean the smallest angle between an information track portion and a normal to the record carrier.

An adjacent information track may deflect radiation which is incident on it out of the path of the radiation coming from an information track being read at a large angle of inclination, i.e. an angle which at most deviates a few degrees from 90°. If optimum use is to be made of the deflection effect, the angle of inclination should be selected smaller.

The deflection effect may be employed in a record carrier which is read either in transmission or in reflection. For a reflection type record carrier the deflection effect is optimum if the angles of inclination $\alpha$ and $\beta$ are such that the relation $180° - (\alpha + \beta)$ is substantially equal to or greater than $\frac{1}{2}$ arc sin NA/n, where n is the refractive index of a transparent medium covering the information structure and N.A. is the numerical aperture of the read objective. The angles of inclination $\alpha$ and $\beta$ may be equal.

In record carriers in which optimum use is made of the deflection effect, the track distance may be half that of known record carriers, without giving rise to increased crosstalk.

It is to be noted that it is known, inter alia from U.S. Pat. No. 3,437,628, to use a record carrier with preformed grooves for recording optically readable information. These grooves serve to reduce the required recording energy and to facilitate tracking during recording. The information is recorded in the bottom of the grooves, so that in each groove only one information track is written and not two as in the record carrier in accordance with the present invention.

Any crosstalk between two information tracks with different inclinations may further be reduced by utilizing polarization effects during read out. A record carrier which is suitable for this purpose and in which the information tracks with the first and the second inclination comprise a first and a second type of information areas respectively, is further characterized in that the information areas are all elongate, that the information areas of the first type have a geometry such that in a first read-beam component, whose direction of polarization is parallel to the longitudinal direction of said information areas and whose effective wavelength is at least of the order of magnitude of the width of the information areas, they produce a maximum modulation and furthermore, in a second read beam component, whose direction of polarization is transverse to the longitudinal direction of the information areas and whose effective wavelength is equal to that of the first read beam component, they produce a minimum modulation, and that the information areas of the second type have such a geometry that they produce a minimum modulation in the first read-beam component and furthermore, they produce a maximum modulation in the second read-beam component.

The expression "information areas being elongate" means that over the entire record carrier the dimension in one direction (the longitudinal direction) of said areas is at least of the order of one and a half times as great as the dimension transverse to said direction. Preferably, the length of the information areas are at least twice as great as the effective wavelength being used. The polarization effects utilized in accordance with the invention may already be obtained if the lengths of the information areas are approximately one-and-a-half times their width. In previously prepared round disk-shaped record carriers, in which each track revolution contains the same amount of information, the average length of the information areas is proportional to the track radius. For tracks on the inner side of the record carrier, the average length of the information areas is thus comparatively small and approximately equal to the width of the areas.

The different geometries of the two types of information areas can be realized by giving said areas different effective widths or different effective depths, and also by orienting the areas in different directions, for example with the longitudinal directions transverse to each other.

The direction of polarization of the optical read beam, which is a beam of electromagnetic radiation, is to understood to mean the direction of the electric field vector, i.e. the E-vector.

The effective wavelength of the read beam is the wavelength at the location of the information structure. Hence, if the information structure is covered with a protective layer having a refractive index n, the effective wavelength is then equal to the wavelength in vacuum divided by n.

This construction makes use of the fact that during the read-out of elongate information areas with a read beam whose effective wavelength is of the order of the width of the areas, the direction of polarization of the read beam will play a part. It has been found that for the information structures considered here, information pits, if read with a parallel polarized read beam, i.e. a beam whose E-vector is parallel to the longitudinal direction of the pits, seen to have a smaller effective depth, i.e. a smaller phase depth, than the same pits if read with a perpendicularly polarized read beam.

The phase depth of the information structure is to be understood to mean the difference between the phase of the zero spectral order and the phase of one of the first spectral orders of the read beam, which orders are formed by the information structure if the centre of the read spot coincides with the centre of an information area. In a first order approximation it is then correct to assume that the various first orders have the same phase. The phase depth depends on a geometry of the information areas, in the case of information pits, specifically on the geometrical depth of said pits and one the angle of inclination of the walls of the pits. In order to obtain the desired phase depth for optimum read-out of the information structures considered here, the information pits, when read with a parallel polarized read beam, should be effectively deeper than when read with a perpendicularly polarized read beam. Information pits which have been optimized for read-out with a parallel polarized read beam are generally not optimized for read-out with a perpendicularly polarized read beam and may even have such geometrical dimensions that they are virtually not observed by the last-mentioned beam. Obviously this also applies to information hills. When in two adjacent tracks, the information areas have been dimensioned for two mutually perpendicular directions of polarization, the track distance can be substantially, for example two times, smaller in comparison with the distance between two tracks of known record carriers comprising only one type of information areas, without increasing the risk of crosstalk.

A different embodiment of a record carrier in which the information track portions with the first and the second inclination respectively contain a first and a second type of information areas, is characterized in that the first type of information areas have a first phase depth and the second type of information areas a second phase depth. By selecting the phase depths of the first and the second type of information areas so that the first type of information areas can be read in an optimum manner using the so-called "central aperture method" and are virtually not observed with the so-called "differential read method" while the second type of information areas are read in an optimum manner with the differential read method and are virtually not observed with the central aperture method, the crosstalk which has already been reduced by the measures in accordance with the present invention, may thus be reduced even further.

In the "central aperture read method" all radiation coming from the record carrier and passing through the pupil of the read objective is concentrated on a single detector. In the case of the differential read method two detectors are employed which are arranged in the far field of the information structure and disposed after each other in the track direction. The different signal of these detectors represents the information being read. The far field of the information structure may be represented by a plane in which the centres of gravity of the subbeams formed by the information structure, specifically of the zero-order subbeam and the first-order subbeams, are separated.

A further embodiment of a record carrier, in which the information track portions with the first and the second inclination, respectively, contain a first and a second type of information areas, is characterized in that the information areas comprise gratings and that the direction of the grating lines of the first type of information areas differs from that of the grating lines of the second type of information areas.

The radiation which is incident on an information grating is diffracted in a direction which is disposed in a plane perpendicular to the direction of the grating lines of said information grating. In addition to the effect of different deflections as a result of the different inclinations of the information tracks, the effect is then also obtained in that the radiation incident on an information area of an adjacent information track is diffracted by said information area in a different direction than the radiation incident on an information area of the information track to be read. Owing to the last-mentioned effect the crosstalk may be reduced even further.

The invention can be used in a record carrier which is entirely provided with information and also in a record carrier in which information can be recorded by the user himself. In such a record carrier, which has been described inter alia in the copending U.S. patent application Ser. No. 140,409, filed Apr. 14, 1980, an optically detectable, servo-track, is formed. This servo-track contains sector addresses, the number of addresses per track revolution being constant, for example 128. The sector addresses cover only a small part of the servo-track. The record carrier portions between the sector addresses are provided with an inscribable material, for example a thin metallic layer, in which the user can record the desired information with the aid of a laser beam, by locally melting the metal. A sector address inter alia contains address information relating to the associated inscribable record carrier portion in the form of address-information areas, which are spaced from each other by intermediate areas.

In accordance with the invention the amount of information that can be recorded in such a record carrier can be increased if the information surface of the record carrier has two different slopes and is further characterized in that sector addresses have been recorded in the slopes of an information-carrying surface, which contain addresses of the associated blank record carrier portions provided with a radiation-inscribable material.

The groove which is formed by two different slopes may be used as a servotrack for tracking purposes during recording. However, alternatively the record carrier may further be characterized in that in the informationless parts of the slopes an optically readable continuous servo-track is formed.

For large angles of inclination, which at the most differ a few degree from 90°, a known read apparatus may be used. Such an apparatus is provided with an optical read system comprising a radiation source which produces a read beam, an objective system for focussing the read beam to a read spot on the information structure, and a radiation-sensitive drection system for converting the read beam which has been modulated by the information structure into an electrical signal. For smaller angles of inclination, of the order of 85°, the read beam should always be incident at right angles to an information track to be read, for optimum use of the deflection effect. The read apparatus is then characterized in that the read radiation produced by the optical read system at the location of the information structure comprises two beam components, which may occur simultaneously or not, whose chief rays make an angle with each other which is substantially equal to or greater than $\frac{1}{2}$ arc sin (NA/n) where N.A. is the numerical aperture of the objective system.

If the beam components are not present simultaneously but are used sequentially, an optical wedge may be included between the radiation source and the objective system, which wedge can be inserted into the radiation path. However, it is alternatively possible to include a mirror in the radiation path which can be rotated and translated at the same time.

In an apparatus in which the beam components are simultaneously projected on the information structure, an additional beam splitter may be provided for separating a subbeam from the read beam produced by the radiation source, as well as an element for directing the extracted subbeam to the information structure.

An apparatus for reading a record carrier in which the information areas of adjacent information tracks can only be read in an optimum manner with one specific direction of polarization, is further characterized in that the two beam components, which appear simultaneously or not, have mutually perpendicular directions of polarization which are respectively parallel and perpendicular to the longitudinal direction of one type of information areas.

An apparatus for inscribing and reading a record carrier in which sector addresses have been recorded in the slopes of an information layer, which sector addresses contain addresses of associated still unrecorded record carrier portions which record carrier portions are adapted to contain information, which apparatus comprises a radiation source producing a write beam, an intensity modulator for switching the intensity of the write beam between a first, write, level and a second, lower, level, is characterized in that the write radiation, at the location of the information mation layer, comprises two beam components which are not simultaneously present, whose chief rays have different directions.

BRIEF DESCRIPTION OF THE DRAWINGS

The invention will now be described in more detail with reference to the drawing wherein.

DETAILED DESCRIPTION OF THE INVENTION

Figure 1:
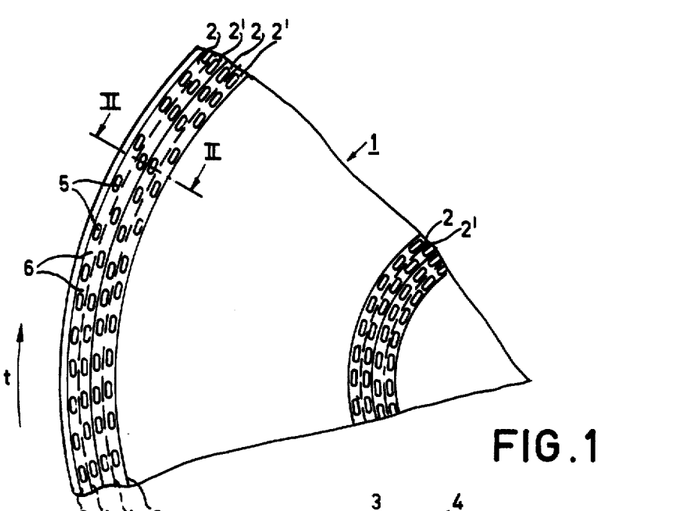
FIG. 1 is an elevation of a part of a record carrier in accordance with the invention FIG. 2 in perspective, shows a small part of a first embodiment of said record carrier FIG. 3 in perspective, shows a small part of a second embodiment of the record carrier

As is shown in FIG. 1, the information structure of the record carrier 1 comprises a plurality of information areas 5 which are arranged in information tracks 2 and 2'. In the track or tangential direction t, the information areas are spaced from each other by intermediate areas 6. The information structure may be a phase structure. The information areas may, for example, be formed by pits pressed into the record carrier surface or hills projecting from said surface. The information structure may, alternatively, be an amplitude structure. The information areas are then, for example, non-reflecting areas in a reflecting surface. Furthermore, the information structure may be a structure which is adapted to be read in reflection or a structure which is adapted to be read in transmission.

The information to be disseminated by means of the record carrier is contained in the variation of the areas structure in the tangential direction only. If a colour television program is stored in the record carrier, the luminance signal may be encoded in the variation of the spatial frequency of the information areas 5 and the chrominance and sound signal in the variation of the lengths of said areas. The record carrier may, alternatively, contain digital information. In that case, a specific combination of information areas 5 and the intermediate areas 6 represents a specific combination of digital ones and zeros.

Figure 5:
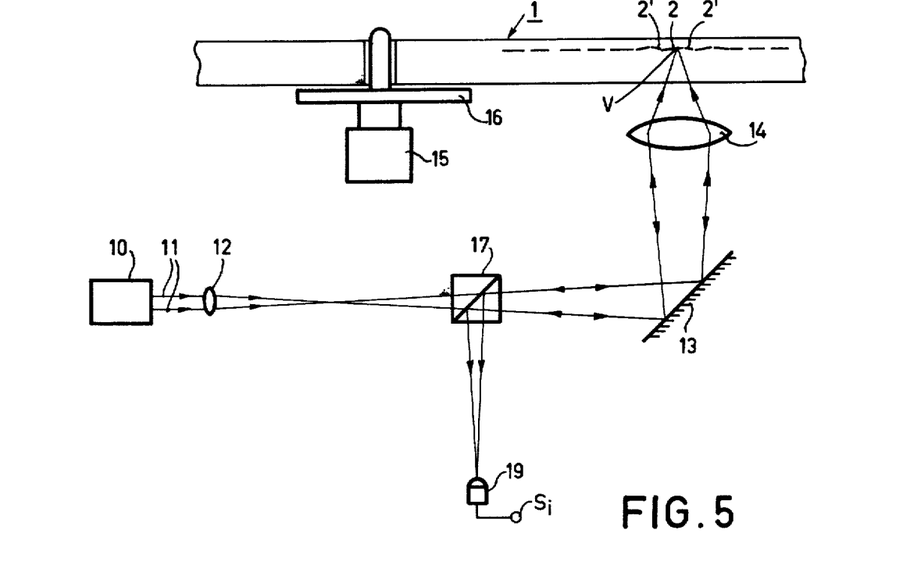
FIG. 5 shows a known read apparatus

The record carrier can be read with an apparatus which is schematically represented in FIG. 5. A monochromatic and linearly polarized beam 11, which is emitted by a gas laser 10, for example a helium-neon laser, is directed to an objective system 14 by a mirror 13. Disposed in the path of the radiation beam 11 is an auxiliary lens 12 which ensures that the pupil of the objective system 14 is filled. A diffraction-limited read spot V is then formed on the information structure. The information structure is schematically represented by the information track 2 and 2', thus, the record carrier is shown in radial cross-section.

The information structure may be located on the side of the record carrier which faces the laser. However, as shown in FIG. 5, the information stucture may also be located on the side of the record carrier which is remote from the laser, so that the record carrier is read through the transparent substrate 8. The advantage of this is that the information structure is protected against fingerprints, dust particles and scratches.

The read beam 11 is reflected by the information structure and, as the record carrier is rotated by means of a turntable 16 driven by a motor 15, it is modulated in accordance with the sequence of the information areas 5 and the intermediate areas 6 in an information track being read. The modulated read beam again traverses the objective system 14 and is reflected by the mirror 13. In order to separate the modulated read beam from the unmodulated read beam, a beam splitter is included in the radiation path. The beam splitter may be a semi-transparent mirror, but alternatively a polarization-sensitive splitting prism. In the last-mentioned case a quarter-wave plate should be inserted between the objective system and the splitting prism. The quarter wave is then a quarter of the wavelength of the read beam 11. The beam splitter 17 reflects a portion of the modulated read beam to a radiation-sensitive detection system 19, which for example comprises a single photo-diode disposed on the optical axis of the read system. The output signal Si of the detector 19 is modulated in accordance with the information stored in the information track being read. The principle of the optical read-out is described in inter alia "Philips' Technical Review" 33, No. 7, pages 186–189 and is not be discussed in more detail.

The half-value width of the read spot V is of the order of magnitude of the track width, or of the dimension of the information areas in the radial direction, so that a part of the read radiation is incident outside the information track to be read. If the track distance is small a portion of the read beam which is used for reading a first information track may be incident on an adjacent information track, and this portion of the radiation may then be modulated by the information areas of the adjacent track. In order to prevent that beam portion form reaching the detector 19, it is now proposed to give the information tracks alternately different slopes.

Figure 2:
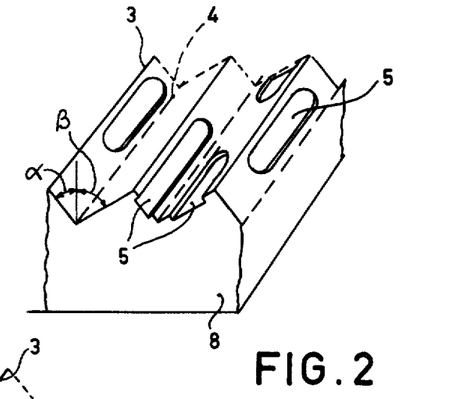

FIG. 2 shows an embodiment of a record carrier in accordance with the invention. This Figure shows a small part of the record carrier in a cross-section taken on the line II—II' of FIG. 1. The information tracks in FIG. 1 with different inclinations are designated 2 and 2' respectively. As shown in FIG. 2 the information tracks are the walls of grooves, whose tops are represented by the uninterrupted lines 3 and whose bottoms are represented by the dashed lines 4. For the sake of clarity the height of the grooves has been exaggerated relative to the thickness of the substrate 8.

Figure 3:
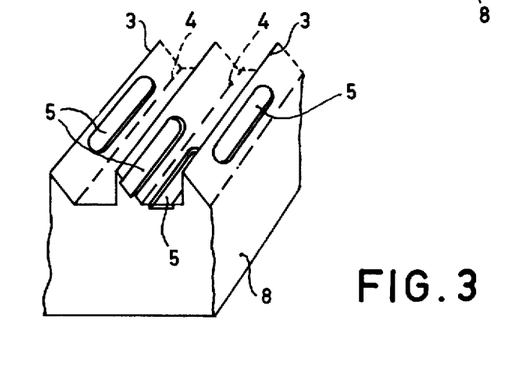

The angles of inclination α and β may be equal, for example both 85°. It is alternatively possible that one of the angles of inclination is greater than the other, for example α = 85° and β = 80°. Furthermore, it is possible that only one of the tracks, for example track 2, is inclined, while the other information track 2', is level, i.e. parallel to the substrate 8. Such a record carrier is shown in FIG. 3.

Figure 4:
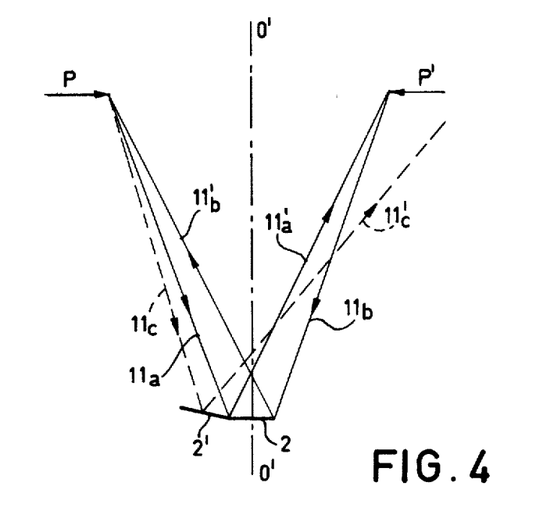
FIG. 4 illustrates the principle of the invention.

FIG. 4 illustrates the principle of the invention by means of a reflecting record carrier. The read beam 11 is focussed to a read spot of a specific size by the objective system 14, whose aperture is designated pp'. Most of the read radiation is incident on the information track 2 to be read. This portion of the radiation is indicated by the border rays 11a and 11b. The reflected border rays 11'a and 11'b re-enter the objective system, so that the beam portion reflected by the information track is concentrated on the detector 9. The portion of the read beam which is incident on the adjacent information track 2', which has a different inclination than the information track 2, is schematically represented by the ray 11c. This ray is reflected by the information track 20 along the ray 11'c. The last-mentioned ray can no longer enter the objective system and is consequently no longer incident on the detector 19. This is the case for most of the radiation which is incident on the information track 2'. Thus, the information track 2' will produce little crosstalk interference in the information read from track 2.

The crosstalk reduction is substantial at large angles of inclination α and β, i.e. angles of inclination which differ from 90° by an amount of the order of a half degree to at the most a few degrees. For these large angles of inclination the objective system need not be corrected in respect to coma. Furthermore, a sufficient portion of the read radiation is then incident on the information pits of an information track being read, so that the modulation depth of the read radiation will be sufficient. For reading a record carrier in which the information tracks have such large angles of inclination, the known read apparatus shown in FIG. 5 may be used. However, allowance should then be made for a minor change of the information signal $S_i$, because the read beam is also obliquely incident on the information track to be read.

For optimum use of the inventive principle the angles of inclination should differ more than a few degrees from 90° and the read beam should always be incident perpendicularly on an information track to be read. The sum of the angles of inclination should be related to the numerical aperture of the objective system in a specific manner. For a reflecting record carrier in the case of perpendicular incidence of the read beam on the information track to be read the sum of the angles of inclination α and β should have the relationship:

$$180° - (α + β) \gtrsim \tfrac{1}{2} \arcsin (N.A./n),$$

where n is the refractive index of the substrate 8 and the signal "∼" means substantially equal to. For a radiation-transmitting record carrier the requirement for the sum (α + β) is different, but is also determined by the N.A. of the read objective.

Two beam components which are each perpendicularly incident on their associated information tracks and whose chief rays consequently enclose an angle which is substantially equal or greater than $\tfrac{1}{2}$ to arc sin (N.A./n) can be obtained in different ways.

Figure 6:
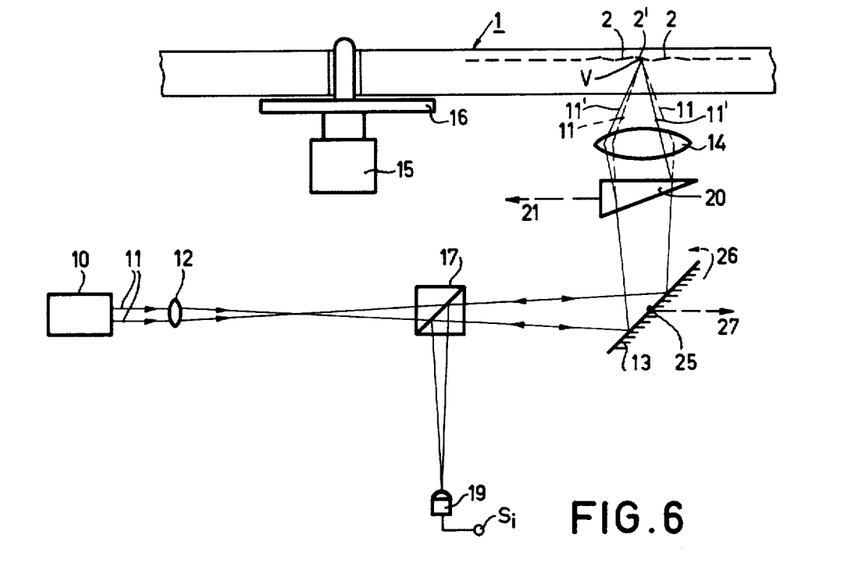
FIG. 6 shows a first embodiment of a read apparatus in accordance with the invention

As an example, in the systems shown in FIG. 6, an optical wedge 20 may be arranged in front of the objective system 14, which can be shifted into and out of the radiation path of the read beam, as is indicated by the arrow 21. When this wedge is inserted in the radiation path the read beam will be deflected to the left, as is indicated by the uninterrupted border rays 11', so that the beam is refracted through a different angle than for the case where the wedge is not included in the radiation path. The path of the read beam for the last-mentioned situation is represented by the dashed border rays 11.

If one of the information tracks has an angle of inclination of 90° to the read beam 11, if the wedge is not inserted in the radiation path, will be perpendicularly incident on the record carrier. If two adjacent information tracks both have an angle of inclination which differs from 90°, the optical elements of the read system are arranged so that, also if the wedge 20 is not included in the radiation path, the read beam is incident on the record carrier somewhat obliquely, depending on the angle of inclination of the information tracks.

Figure 7:
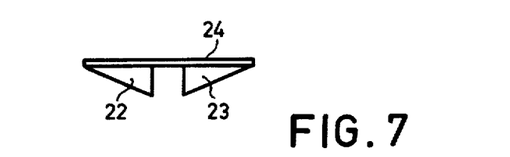
FIG. 7 shows a part of a second embodiment of such an apparatus

An apparatus for reading a record carrier containing information tracks with two different inclinations may also comprise two wedges, which are then disposed at the location of the wedge 20 in FIG. 6. FIG. 7 shows these two wedges 22 and 23, which may be accommodated on a common support 24 and may be made as a single element.

It is alternatively possible to change the direction of incidence of the read beam on the record carrier with a mirror, for example the mirror 13 in FIG. 6, which is arranged for rotation about the axis 25. If this mirror is rotated in the direction of the arrow 26, the read beam is deflected to the left. In order to achieve that the beam then also fully traverses the objective system, the mirror 13 should simultaneously be moved in the direction of the arrow 27.

Figure 8:
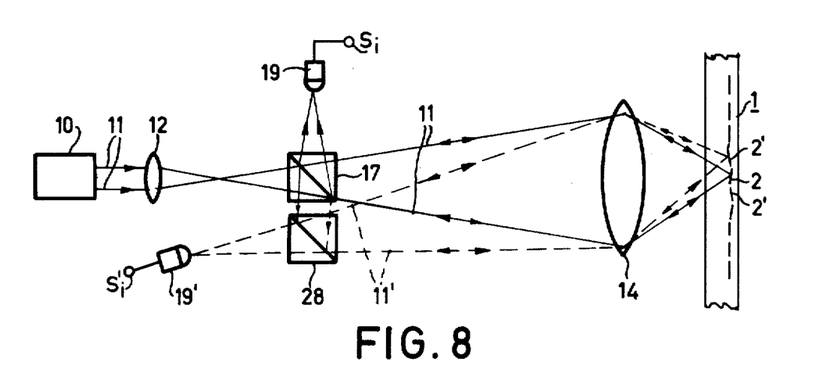
FIG. 8 shows a third embodiment of a read apparatus

The two read beam components with different directions may also appear simultaneously. FIG. 8 schematically represents an example of an apparatus in which this is the case. The splitting prism 17 transmits part of the beam 11 emitted by the source to the objective system 14 and reflects a part (11'). The reflected beam component 11' is reflected to the objective system 14 by a further splitting prism 28, the beam component 11 passing obliquely through the objective system. The beam component 11, which has been reflected by the information structure, is reflected to the detector 19 by the splitting prism 17, while after reflection by the information structure, the read beam component 11' is transmitted to the detector 19' by the splitting prism 28.

In an electronic circuit, not shown, for processing the detector signals Si and Si' steps have been taken to ensure that each time only one of the signals Si or Si' is transferred for further processing.

The signal for changing over from the beam component 11 to the beam component 11', in FIG. 8, thus for the change-over from signal Si to signal Si', may be derived from the signal read from the record carrier. The record carrier is then provided with marks, for example at the end of each television picture, which indicate when the direction of incidence of the read beam is to be changed.

Figure 9:
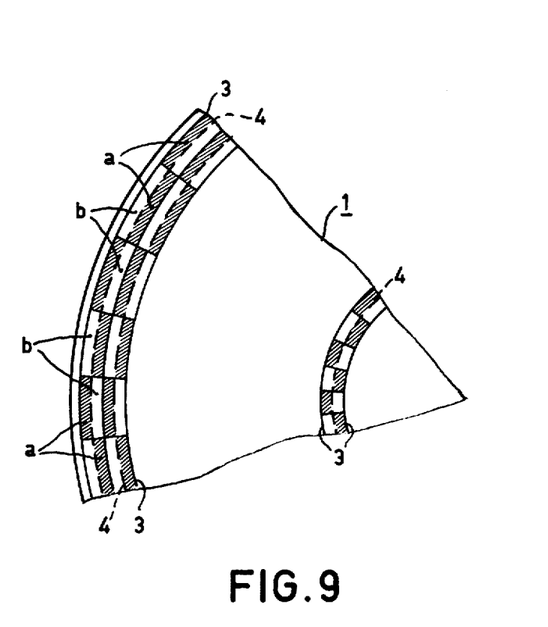
FIG. 9 shows a record carrier in accordance with the invention having different slopes per track revolution

FIG. 9 shows part of a different embodiment of a record carrier in accordance with the invention. This Figure is on a different scale than FIG. 1, so that the individual information tracks can no longer be distinguished. The information tracks are now divided into portions a and b, portions a having a different inclination than the portions b. If a television program is recorded on the record carrier, each of the portions a and b contain the information corresponding to one television line.

Figure 10:
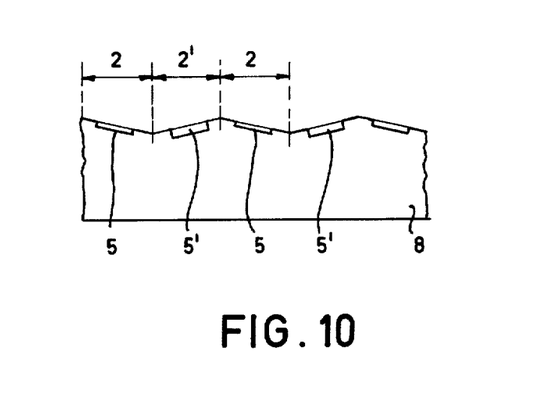
FIG. 10 shows a record carrier in which the information tracks with different slopes comprise information areas of different phase depths

FIG. 10 shows a radial cross-section of a part of a record carrier in which the information areas 5 of the first information tracks 2 with a first inclination have a different phase depth than the information areas 5' of the second information tracks with a second inclination. The phase depths may be selected so that the information areas 5 are read in an optimum manner with the differential method and are virtually not observed in the case of read-out with the central-aperture method, while the information areas 5' are read in an optimum manner with the central-aperture method and are virtually not observed in the case of read-out with the differential method. The phase depth of the information areas 5 is for example 110° and that of the information areas 5' for example 180°. The different phase depths of the information areas 5 and 5' may be realized by making the effective depths of said areas different. The effective depth of an information area is determined inter alia by the geometrical depth of the area and the wall steepness, within the information track, of the area.

For more details as regards information track portions with different phase depths reference is made to the prior application Ser. No. 925,433. This Application also states that the information track portions of different phase depths are preferably arranged as is indicated in FIG. 9.

Figure 11:
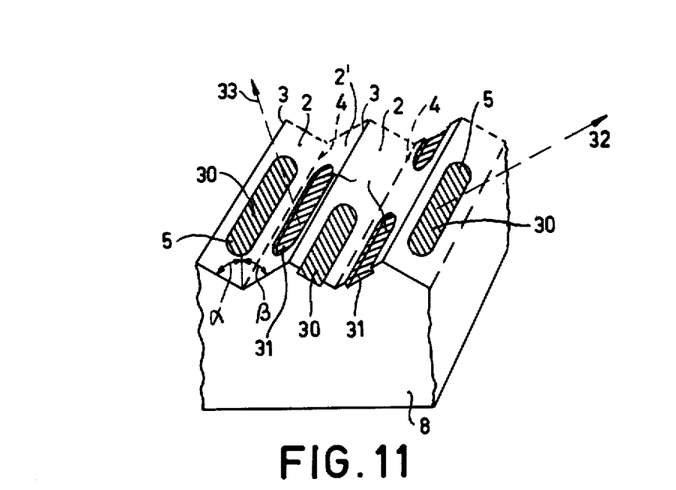
FIG. 11 shows a record carrier in which information tracks with different slopes contain information areas with differently oriented grating lines

As described in patent application Ser. No. 464,843, which has been laid open to public inspection, the information tracks in an optically readable record carrier can also be arranged nearer each other if the information areas take the form of minute gratings, the grating lines for the information areas of a first track portion having a different orientation than the grating lines of the information areas for an adjacent track portion. The measures in accordance with patent application Ser. No. 464,843 may then be combined with those in accordance with the present invention. FIG. 11 in perspective shows a small part of a record carrier in which the adjacent track portions 2 and 2', apart from different inclinations, also have differently oriented grating lines 30 and 31. The direction 32 of the read beam component coming from a grating 5 is then determined not only by the angle of inclination α, but also by the orientation of the grating lines 30. The direction 33 of the read beam component coming from a grating 5' is determined both by the angle of inclination β and by the orientation of the grating lines 31. This provides a very good separation of the beam components originating from the information areas 5 and 5'. When the record carrier in accordance with FIG. 11 is read two detectors must be used, which are arranged in the directions of the arrows 32 and 33.

In for example the previous patent application Ser. No. 925,229 it has been proposed to employ an optical record carrier as a storage medium for information other than video information, and specifically as a storage medium in which information can be recorded by the user himself. An example of this is information obtained from an (office) computer or radiograms made in a hospital. For such a use the user is supplied with a record carrier which is provided with a so-called, for example spiral, servotrack, which extends over the entire record carrier area.

When information is recorded by the user, the radial position of the write spot relative the servotrack is detected and corrected with the aid of an opto-electronic servosystem, so that the information is recorded with great accuracy in a spiral track of constant pitch or in concentric tracks with a constant track spacing. The servotrack is divided into a plurality of sectors, for example 128 per track revolution.

Figure 12:
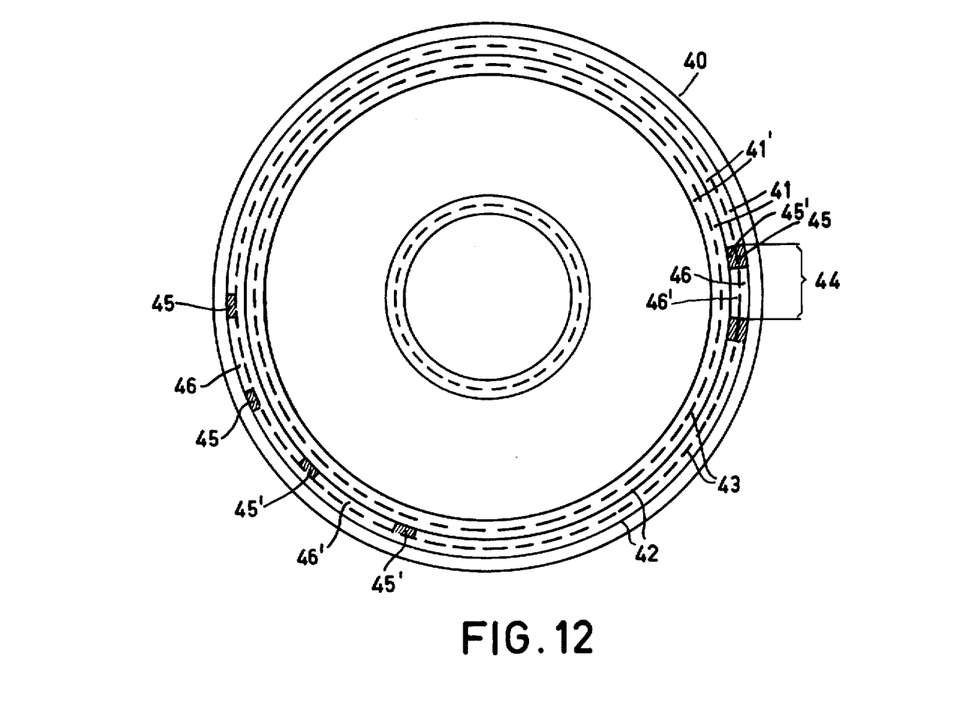
FIG. 12 shows a record carrier in accordance with the invention in which information can be recorded by a user

In accordance with the invention the servotrack may take the form of a groove with two groove walls with different inclinations, but preferably equal but opposite inclinations. FIG. 12 shows such a record carrier 10. The two walls of the servotrack are designated 41 and 41'. These walls are bounded by the top lines 42 and the bottom lines 43. Each groove comprises a number of sectors 44, which each comprise a track portion 46 and 46' respectively, in which information and a sector address 45 or 45' can be recorded in which address, in addition to other control information, the address of the associated track portion 46 or 46' is encoded in address information areas in for example digital form.

Figure 13:
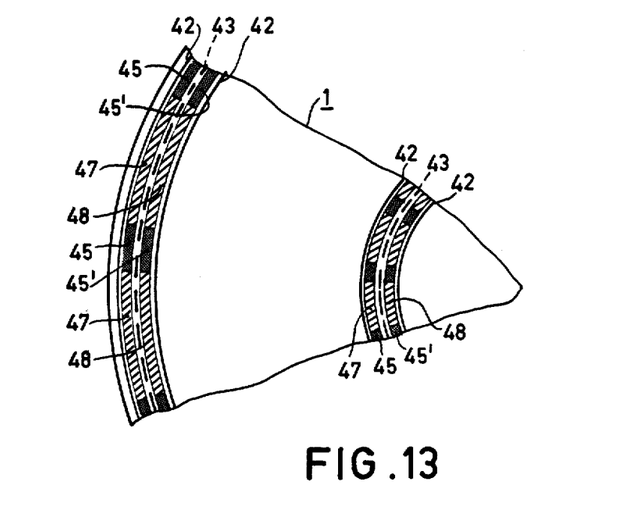
FIG. 13 shows such a record carrier in which a servotrack is formed in each slope.

When the two slopes 41 and 41' are used as references for the tracking of the radiation spot, the position of the centre of this spot relative to the bottom line 43 or the top line 42 is determined. However, during the write cycles, the write spot should always be positioned on the centre of one of the slopes 41 and 41'. Therefore, it is preferred to form an optically detectable servotrack, for example a groove, in the slopes 41 and 41' themselves, as is shown in FIG. 13. This Figure shows a small part of an inscribable record carrier. The servotracks, designated 47 and 48, are located between the lines 42 and 43. The sector addresses 45 and 45' form part of these servotracks.

Equipment with which information can both be recorded and read is known. As an example, the prior patent application Ser. No. 925,229, which is incorporated herein by reference, describes a combined write-read apparatus, in which the write beam and read beam are produced by the same radiation source. In this apparatus the intensity of the radiation beam produced by the radiation source is switched for example by means of an intensity modulator, between a first-write-level and a second level which is sufficiently high for reading the information, but not sufficiently high for recording information. In other write-read apparatus two separate radiation sources may be used for reading and writing.

If a combined write-read apparatus is to be used in conjunction with the record carrier of FIGS. 12 and 13, steps must be taken to ensure that the write beam and the read beam in this apparatus are always perpendicularly incident on one of the groove walls 41 and 41'. The same means may then be used as described with reference to FIGS. 6, 7 and 8.

In respect of the optical components a combined write-read apparatus may then be similar to for example an apparatus in accordance with FIG. 6, an intensity modulator, which is known per se, for example an acousto-optical or an electro-optical modulator, being included between the radiation source 10 and the beam splitter 17.

The steps in accordance with the present invention may be combined with those described in the pending U.S. patent application, Ser. No. 87,276, filed Oct. 22, 1979, which is incorporated herein by reference. In that application it is described that, during read-out of a record carrier with elongate information areas by means of a read beam whose effective wavelength is at least of the order of magnitude of the width of the information areas, polarization effects will play a part. In the aforementioned situation an information pit, if read with a perpendicularly polarized beam, i.e. a beam whose electric field vector is transverse to the longitudinal direction of the information areas, will seem deeper than when the same information pit is read with a parallel polarized read beam, i.e. a beam whose electric-field vector is parallel to the longitudinal direction of the information pit.

In the record carrier in accordance with the present invention the information areas in a first information track having a first inclination can be made to differ from those in a second information track with a second inclination, in such a way that for example the information areas in the first information track are read in an optimum manner by means of a perpendicularly polarized beam and are hardly observed by a parallel polarized beam, whilst the information areas of the second information track are read in an optimum manner by a parallel polarized beam and are hardly observed by a perpendicularly polarized beam. By using the correct direction of polarization corresponding to the information areas of the information track to be read, the crosstalk, which has already been reduced by the steps in accordance with the present invention, may be reduced even further.

The information areas of the first information tracks may have a different effective width or different effective depth than the information areas of the second information tracks. It is alternatively possible that the information areas of the first information tracks have the same dimensions, except for their lengths, as the information areas of the second information tracks, the longitudinal directions of the information areas in the first information tracks for example being transverse to those of the information areas in the second information tracks. Such a record carrier is shown, by way of example, in FIG. 14.

Figure 14:
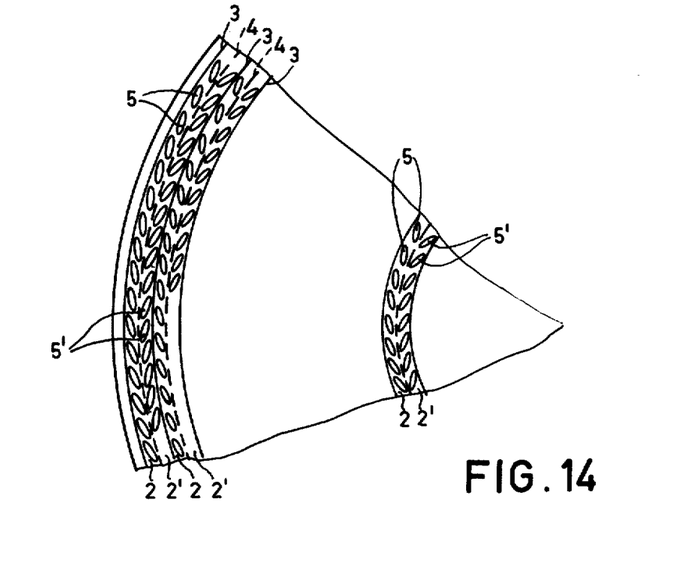
FIG. 14 shows a record carrier in which information tracks with different slopes contain information areas with different longitudinal directions.

In this figure the information areas of the information tracks 2 are again designated 5 and those of the information track 2' are again designated 5'. The longitudinal direction of the information areas 5 is preferably perpendicular to those of the information areas 5', while the two longitudinal directions make an angle of 45° with the track direction. The information areas 5 are, for example, read with a first beam, whose E-vector is parallel to their longitudinal direction. For the information areas 5' this beam is perpendicularly polarized, so that the information areas 5' are virtually not observed with this beam. Information areas 5' are read with a second beam whose E-vector is perpendicular to that of the first beam. The top lines 3 and the bottom lines 4 indicate that the information areas 5 and 5' are situated at different slopes.

For further details in respect of possible geometries of the information areas in the first and second information tracks, which areas are sensitive to different directions of polarization, reference is made to the pending application (Ser. No. 87,276).

The last-mentioned patent application also describes how to obtain the two read beam components with mutually perpendicular directions of polarization, required for reading the two types of information areas.

In the read apparatus in accordance with the present invention two read beam components are generated. In order to render this apparatus suitable for reading a record carrier with information areas which are sensitive to different directions of polarization, the beam components should have different directions of polarization. This may, for example be achieved by replacing the elements 17 and 28 in the apparatus of FIG. 8 by polarization-sensitive splitting prisms and by ensuring that the radiation source 10 emits radiation whose direction of polarization makes an angle of 45° with the direction of polarization transmitted by the splitting prisms. Between these splitting prisms and the objective system 14 a λ/4 plate should then be inserted, λ being the wavelength of the read radiation.

The combination of information tracks with different inclinations containing different types of information areas which can be discriminated in respect of polarization effects, may be used both in a factory-recorded record carrier containing for example a television program or an audio program, and in a record carrier which can be inscribed by the user himself.

What is claimed is:

1. A record carrier containing information stored in a form readable by a beam of radiation, said carrier comprising a substrate and at least one elongated track on a surface of said substrate, said track having at least two longitudinally extending surface portions, a first and second plurality of information areas adapted to produce a detectable change in a beam of radiation when illuminated by the beam, said information areas of said first plurality being disposed on one of said surface portions and spaced from each other in the longitudinal direction of said track to define a first information track and said information areas of said second plurality being disposed on the other of said surface portions and spaced from each other in the longitudinal direction of said track to define a second information track, said surface portions being inclined in different directions with respect to a line normal to said surface of said substrate and the longitudinal axis of said track so that when one of said first and second information tracks is illuminated by a read beam of radiation, the radiation incident on said one information track is deflected thereby in a first direction and radiation of the read beam incident on the other of said first and second information tracks is deflected thereby in a second direction which is different from said first direction thereby reducing crosstalk between said first and second information tracks.

2. The record carrier according to claim 1 wherein said substrate is planar and said track is a groove formed in the surface of said planar substrate, said groove having at least two longitudinally extending wall surfaces inclined in said different directions with respect to said line normal to said surface of the substrate, each of said wall surfaces defining a respective one of said surface portions containing a respective one of said first and second information tracks.

3. The record carrier according to claim 2 wherein said groove has a V-shaped cross section in a plane perpendicular to the longitudinal direction of said groove and wherein each of said surface portions is defined by a respective one of the longitudinally extending side walls of said v-shaped groove.

4. The record carrier according to claim 2 wherein said groove has a U-shaped cross section in a plane perpendicular to the longitudinal direction thereof and a pair of longitudinally extending side wall surfaces and a longitudinally extending bottom wall surface, one of said pair of side wall surfaces and bottom wall surface defining one of said surface portions and another of said pair of side wall surfaces and bottom wall surface defining the other of said surface portions.

5. The record carrier according to claim 4, wherein each of said side walls of said groove define a respective one of said surface portions.

6. The record carrier according to claim 4, wherein one of said side wall surfaces and said bottom wall surface each define a respective one of said surface portions.

7. The record carrier according to claim 6, wherein said bottom wall surface is generally parallel to the plane of said substrate.

8. The record carrier according to claims 1 or 2 wherein said substrate is a disc and said track and said surface portions thereof each define a spiral so that each of said first and second information tracks forms a spiral one of which is adapted to to read from the outer periphery of said disc towards the center and the other from the center of said disc towards the outer periphery.

9. The record carrier according to claims 1 or 2 wherein said surface portions are inclined at equal angles with respect to said line.

10. The record carrier according to claims 1 or 2 wherein said surface portions each have a reflective layer covering at least the respective one of said first and second information tracks thereon.

11. The record carrier according to claim 10 wherein one of said surface portions is inclined at an angle $\alpha$ and the other of said surface portions is inclined at an angle $\beta$ with respect to said line, said angles being such that $180° - (\alpha + \beta)$ is substantially equal to or greater then $\frac{1}{2}$ arc sin NA/n, where n is the refractive index of a medium adjacent said first and second information tracks and N.A. is the numerical aperture of a read objective used for focusing a read beam to a spot on said information tracks.

12. The record carrier according to claims 1 or 2 wherein said information areas are elongated, said information areas of said first plurality being adapted to produce maximum modulation in a read beam of radiation polarized in a first direction parallel to the longitudinal direction of said information areas of said first plurality and to produce minimum modulation of a read beam of radiation polarized in a direction perpendicular to said first direction, and said information areas of said second plurality being adapted to produce maximum modulation in a read beam of radiation polarized in a direction perpendicular to said first direction and produce minimum modulation in a read beam polarized in a direction parallel to said first direction.

13. The record carrier according to claims 1 or 2 wherein said information areas of said first plurality have a first phase depth and said information areas of said second plurality have a second phase depth which is different from said first phase depth.

14. The record carrier according to claims 1 or 2 wherein said information areas each comprise a plurality of gratings, the direction of said gratings of said information areas of said first plurality being different from the direction of said gratings of said information areas of said second plurality.

15. The record carrier according to claims 1 or 2 including a layer of radiation inscribable material disposed on at least one of said surface portions for writing thereon information with a beam of radiation, and wherein the information track on said one surface portion is associated with and defines an address for information to be written on said material.

16. The record carrier according to the claim 15 wherein said track contains a servotrack for guiding a read beam during writing of information on said material.

17. An apparatus for reading information stored on a record carrier having a substrate and an elongated groove formed therein, the groove having at least two longitudinal extending surfaces, and a plurality of spaced apart information areas formed in each of said surfaces, said information areas on each surface defining an information track containing information to be read, said apparatus comprising means for producing two radiation beam components, an objective for focussing radiation from said producing means to a read spot on an information track to be read and a radiation sensitive detector for converting radiation, which has been modulated by the information areas, into an electrical signal, the axes of said two beam components making an angle with respect to each other which is substantially equal to or greater than $\frac{1}{2}$ arcsin (NA/n), where N.A. is the numerical aperture of said objective, and n is the refractive index of a medium adjacent said information tracks.

18. An apparatus according to claim 17 wherein said producing means includes means for generating a single beam of radiation, an optical wedge disposed in front of said objective and means for supporting said wedge for movement into the path of said single beam to thereby form one of said beam components and out of the path of said single beam to thereby form the other of said two beam components.

19. The apparatus according to claim 17 including a reflecting element mounted for simultaneous rotation and translation arranged in the path of the read beam.

20. The apparatus according to claim 17 wherein said producing means includes means for generating a single beam of radiation, means for splitting said single beam into two beams defining said two beam components, and means disposed in the path of at least one of said two beams for diverting said at least one beam to said objective.

21. The apparatus according to claim 17 wherein the information areas are elongated and wherein said two beam components have mutually perpendicular directions of polarization which are respectively parallel and perpendicular to the longitudinal direction of the information areas on one of information tracks.

22. The apparatus according to claim 17 wherein portions of said substrate are provided with radiation inscribable material and said information areas define a plurality of sector addresses each associated with a respective one of said portions provided with said inscribable material, and including means for successively producing two write beam components whose axes have different directions and an intensity modulator for switching the intensity of said write beam components between a first write level and a second, lower, level.

* * * * *